United States Patent Office 3,255,922
Patented June 14, 1966

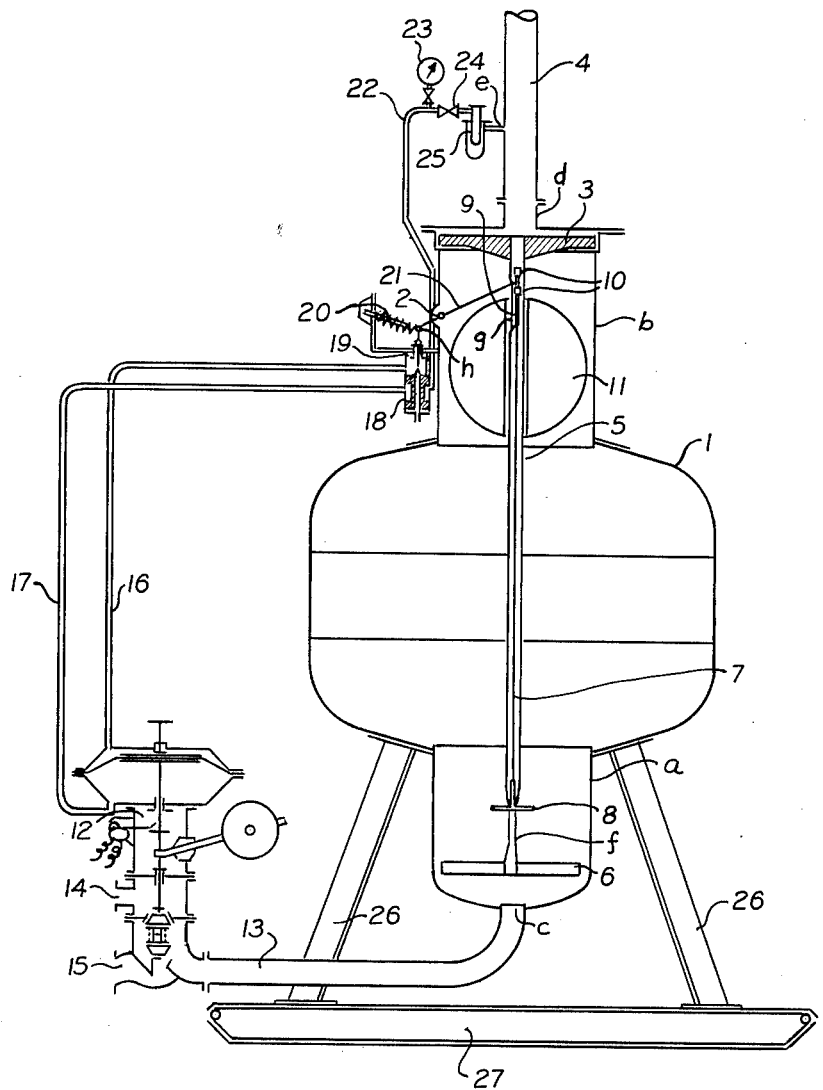

3,255,922
FLOWMETER FOR OIL
Sebastian Socol and Constantin Evghenide, Bucharest, and Ioan Iacob and Arion Ionascut, Cimpina, Rumania, assignors to Ministerul Petrolului, Bucharest, Rumania, a firm of Rumania
Filed Feb. 23, 1965, Ser. No. 434,594
Claims priority, application Rumania, Feb. 27, 1964, 47,584
2 Claims. (Cl. 222—67)

The present invention relates to a flowmeter designed for continuous and automatic metering of oil and water volumes which are leaving the oil and gas, or oil, gas and water separators. The device of this invention can be easily connected in series with any type of separator, and can be easily transported and mounted at gathering and separator batteries, where the metering of liquid phases is necessary.

There are already known many devices in the art for volumetric measurements, consisting of a cylindrical vessel having at the upper and lower parts a small cylindrical cavity, but of a smaller diameter, in order to insure a higher metering accuracy.

For all of these known devices, the main controlling element is a float maintained either by an oscillating lever, or by a guiding rod which is arranged for limited reciprocal longitudinal travel; at the higher and lower limit positions of the float, the rod is shifted from one operative position to another, which in turn commands the movements of the valves.

The devices of the aforedescribed type which have a float maintained on an oscillating lever, have the disadvantage that, due to the limited length of the lever, the metering vessel height is limited too, and, consequently, the effective volume of the measuring chamber is also limited.

In the case of flowmeter devices provided with a float sliding directly on a rod which actuates the valves of the loading-discharging measuring chamber another disadvantage appears, namely the fact that, if on the float guide-rod there is deposited paraffin or other impurities from oil, such impurities can hinder the free movement of the float, blocking it at a certain level and causing the guide-rod to move upward, which causes a premature opening of the discharge valve, when the vessel is not completely filled to the prescribed level. The aforedescribed malfunction results in erroneous measurements.

The flowmeter of the present invention eliminates all of the aforedescribed disadvantages due to the fact that the metering and the command for closing and opening the three way valve, whose function is to allow the oil to pass from a separator to the flowmeter and to discharge the metered oil, is performed by a device consisting of a rigid vertical pipe, provided with windows at the upper and lower ends; on the outer surface of the pipe a spheric float is slidably arranged, which is raised and lowered by the liquid in the flowmeter; and inside this pipe there is provided a wire rope which at its lower end has a stroke limit stopper, with two arms extending outside the pipe diameter through its two lower windows; the upper sides of the two arms have the shape of a knife edge which helps cutting away the paraffin deposited on the float. The upper end of the wire rope is provided with a short rod extension. The latter is provided with stoppers, on which a fork is resting, whose arm controls, by means of a spring and slide-valve device, the flow of the pneumatic working agent toward a three way valve, when the float on its upward stroke and at its highest limit acts on the fork rod, which at its contact side with the float, has a knife edge shape also for cutting away the paraffin deposited on the float. Below, an embodiment of the invention is illustrated and described in connection with a single figure, which represents a cross-sectional schematic view through the device of the invention. Referring now specifically to the drawing, the flowmeter, according to the invention, consists of a cylindrical vessel 1, having at both its lower and upper ends the respective extensions $a$ and $b$ of cylindrical shape also, which have smaller diameter than the diameter of body 1.

The lower extension $a$ is closed at its lower end, and is provided with an orifice $c$ for oil loading and discharging.

The upper cylindrical extension $b$ is provided, on its lateral wall, with a sealed pivot 2, mounted opposite the maximum upper liquid level, and at its upper end is provided with a sealed lid 3 which is in communication with a flanged coupling $d$ which is, in turn, connected with the gas outlet pipe 4. The latter is provided with a connection for the actuating gas.

Inside the vessel 1 and inside the extension $a$ and $b$, there is vertically mounted a pipe 5, which is provided at its lower end and opposite the maximum lower limit of the metered liquid with two elongated windows $f$, facing each other, and at its upper end and opposite the sealed pivot 2, is provided with a lateral window $g$.

The pipe 5 is supported by the lid 3 through which it passes and on its lower end is provided with four guiding wings 6. Through the pipe 5 is passed a flexible and resistant wire rope 7, having at its lower end a stroke limit stopper 8 provided with two arms, which extend outside the pipe 5 through the windows $f$.

Both of the arms of the stroke limit stopper 8, have the upper sides knife edge shaped. At its upper end, the wire 7 is provided with a short metallic rod extension 9, which has two stoppers 10. A spherically shaped float 11, having a diameter close to the inside diameter of the cylindrical extensions $a$ and $b$, passes over the pipe 5, and is arranged to slidably reciprocably move over the pipe 5.

A standard type pneumatically actuated three way valve 12, having three operative positions is arranged as illustrated. The three way valve 12 can be moved from a neutral position to either operative working positions and can be manually blocked in the working position. The three way valve is provided with an electrical counting, recording and position signalling device, which is mounted on the flowmeter feed and discharge pipe 13, which is connected to the orifice $c$ of the lower extension $a$ of the vessel 1, and which is also connected by means of a flanged coupling 14 to the separator outlet (not illustrated), and through a coupling 15 to the metered liquid discharge pipe (not illustrated). Two pressure lines 16 and 17 are connected to the lower and upper sides of the valve 12 membrane chamber, and to the pneumatic slide-valve distributor 18, for directing the working agent to the upper and lower sides of the membrane.

The slide-valve member of the distributor 18 is moved to one of two working positions, by a rod 19 linked at a point $h$ with a spring pawl 20 used for maintaining it in the selected position, and is also pivotably connected with an arm 21, which is mounted on the sealed pivot 2, and which has at its innermost end a fork shaped extension, which projects between the stoppers 10 belonging to the metallic extension 9 and to the wire rope 7, through the window $g$ of the pipe 5. The fork shaped extension serves to support the wire rope 7 and is one of the actuating elements for changing the position of the three way valve 12.

The working agent used for the pneumatic actuation of valve 12, comprises the gas evacuated through the pipe 4 which is partially collected through the intake $e$ and sent to the distributor 18 through a pipe 22, provided with a pressure gauge 23, a pressure reducer 24 and a filter 25.

The entire device is mounted, by means of the supports 26, on a transportable metallic skid 27, or on another convenient set-up which insures easy transportation.

The flowmeter device of this invention operates as follows: When the liquid enters into the measuring chamber of vessel 1 through the three-way valve 12, coupling 14 and pipe 13, the liquid level inside the chamber is raised and the float 11, due to its ascending force caused by the rising liquid, lifts the arm 21 with the fork shaped extension which, through the spring pawl 20 and rod 19, moves the pneumatic distributor slide valve 18 to the lower position. The working agent then enters through the pipe 17 under the membrane of valve 12, while the gas which was acting on the upper side of the membrane is released into the atmosphere through the pipe 16 and through the same pneumatic distributor 18.

When the gas pressure enters the valve 12 above the membrane, the latter pushed downward, pulling with it the double valve of the valve 12, which closes the communication between the flowmeter and stock tank, and opens the entrance of the separator oil for filling again the flowmeter.

The raising of the oil level inside the measuring chamber, raises the float 11 too, which at the same aforedescribed upper level limit will cause the change-over command to occur, thereby repeating the already described cycle.

In order that during the change-over operation the three-way valve 12, the oil does not bypass the measuring chamber, the valve 12 has been designed with a neutral position. The flowmeter, according to the invention, presents the following advantages:

(a) It can be used at oil separator batteries for accurate metering of the oil and water, eliminating the disadvantages created by paraffin and impurities deposits;

(b) It is easily transported and connected to any type of separator;

(c) It has a simple design and is easily handled and serviced;

(d) It represents an important element for the rationalization and automation of the separating, collecting and transferring operations in the petro-chemical oil recovery industry, leading to the elimination of the test tanks and to the substantial reduction of the total number of the stock tanks.

Although this invention has been illustrated and described with reference to one preferred embodiment thereof, it is to be understood that it is in no way limited to the details of such embodiment but is capable of numerous modifications within the scope of the appended claims.

We claim:

1. An improved flowmeter, for continuous and automatic metering of oil and water volumes at the outlet of oil separators, mounted on a transportable support, comprising in combination, a cylindrical measuring chamber provided with upper and lower reduced diameter cylindrical extensions in which is arranged a float, actuating means operatively connected to said float, said actuating means including a vertical rigid pipe 5, said pipe 5 being arranged inside said measuring chamber, provided at its lower and upper ends with windows *f* and *g*, and said float 11 being slidably arranged over said pipe 5 to be moved up and down by the liquid level inside said flowmeter, a wire rope 7 being disposed inside said pipe 5 which has attached at the lower end a stroke limit stopper 8 with two arms extending outside the pipe 5 through said lower pipe windows *f*, the upper sides of said two arms being knife edge shaped for cutting away the paraffin that may deposit on the float 11, and at the upper end the wire rope 7 is provided with a short rod extension 9 which has the stoppers 10, on which is resting a fork whose arm 21 is opening, by means of a spring and pawl device 20 and a distributor 18, the flow of the pneumatic working agent toward the three-way valve 12 when the float 11, on its upward stroke and at the highest limit point is leaning on said fork arm 21, which on its contact side with the float 11 has a knife edge profile, said float 11 on its downward stroke and lowermost limit point of travel is resting on the stopper 8.

2. A flowmeter device for automatic metering of liquid volumes, comprising in combination, a measuring chamber, pipe means supported in said measuring chamber, float means slidably disposed over said pipe means and adapted to move to upper and lower limit positions in accordance with the liquid level in said measuring chamber, liquid inlet and liquid outlet means respectively operatively connected to said measuring chamber, gas actuated valve means operatively connected to said liquid inlet and liquid outlet means for controlling the liquid flow to and from said measuring chamber, gas outlet means connected to said measuring chamber, gas pipe means operatively connecting said gas outlet means to said gas actuated valve means, check valve means in said gas pipe means for selectively controlling the gas flow from said measuring chamber to said gas actuated valve means, and means intermittenly connecting said check valve means to said float means, whereby said float means is raised and lowered in said measuring chamber in accordance with the liquid level therein and intermittently actuates said check valve means by the agency of said connecting means when said float reaches its upper limit position.

References Cited by the Examiner

UNITED STATES PATENTS 450,777   4/1891   Stensland _____ 137—429 X

LOUIS J. DEMBO, *Primary Examiner.*

HADD S. LANE, *Examiner.*